United States Patent
Yang et al.

(10) Patent No.: US 9,252,463 B2
(45) Date of Patent: Feb. 2, 2016

(54) BATTERY CHARGING SYSTEM HAVING MULTIPLE CHARGING MODES

(75) Inventors: Dezhong Yang, Nanjing (CN); Nanfei Wu, Nanjing (CN); Junya Duan, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 854 days.

(21) Appl. No.: 13/206,800

(22) Filed: Aug. 10, 2011

(65) Prior Publication Data

US 2012/0098495 A1    Apr. 26, 2012

(30) Foreign Application Priority Data

Oct. 21, 2010  (CN) ........................... 2010 1 0514214
Oct. 21, 2010  (CN) ........................... 2011 1 0039840
Feb. 13, 2011  (CN) ...................... 2011 2 0040768 U

(51) Int. Cl.
*H02J 7/00*      (2006.01)
*H01M 10/44*   (2006.01)

(52) U.S. Cl.
CPC ............... *H01M 10/44* (2013.01); *H02J 7/007* (2013.01)

(58) Field of Classification Search
CPC ....... H02J 7/0044; H02J 7/0045; H02J 7/007; H01M 10/44
USPC ................................. 320/113, 115, 150, 160
See application file for complete search history.

(56) References Cited

U.S. PATENT DOCUMENTS

| | | | | |
|---|---|---|---|---|
| 7,825,636 | B2 * | 11/2010 | Partin et al. .................... | 320/160 |
| 2004/0101747 | A1 * | 5/2004 | Bushong et al. ............... | 429/163 |
| 2004/0263119 | A1 * | 12/2004 | Meyer et al. ................... | 320/116 |
| 2005/0057225 | A1 * | 3/2005 | Marquet ......................... | 320/138 |
| 2006/0061330 | A1 * | 3/2006 | Sato et al. ....................... | 320/125 |
| 2008/0036426 | A1 * | 2/2008 | Kung et al. ..................... | 320/160 |
| 2009/0027013 | A1 * | 1/2009 | Odaohhara ..................... | 320/160 |
| 2010/0060232 | A1 * | 3/2010 | Boyles et al. .................. | 320/107 |
| 2010/0213900 | A1 * | 8/2010 | Carrier et al. .................. | 320/134 |
| 2010/0270971 | A1 * | 10/2010 | Simoes et al. ................. | 320/111 |
| 2010/0289457 | A1 * | 11/2010 | Onnerud et al. ............... | 320/162 |
| 2010/0301812 | A1 * | 12/2010 | Aiura ............................. | 320/160 |

* cited by examiner

*Primary Examiner* — Richard Isla Rodas
*Assistant Examiner* — Nathaniel Pelton
(74) *Attorney, Agent, or Firm* — McDermott Will & Emery LLP

(57) ABSTRACT

The present application provides a charging system having a charger and a battery. The charging system provides a quick-charging mode and a normal-charging mode. The quick-charging mode may be activated to charge the battery if certain conditions are met and the charging system may also have an indicating device for indicating when the quick-charging mode is finished. More specifically, the charger of the present application provides selective charging modes and provides an ultra-quick charging solution which may be controlled by the changes in the temperature of the battery and which can increase the charging power to quickly provide enough energy to finish a work task.

23 Claims, 4 Drawing Sheets

BATTERY CHARGING SYSTEM HAVING MULTIPLE CHARGING MODES

CROSS-REFERENCE TO RELATED APPLICATIONS

This application claims priority to CN 201010514214.2, filed Oct. 21, 2010, CN 201110039840.5, filed Oct. 21, 2010 and CN 201120040768.3, filed Feb. 13, 2011, which are hereby incorporated by reference.

FEDERALLY SPONSORED RESEARCH OR DEVELOPMENT

Not Applicable.

TECHNICAL FIELD

The present application relates to a charging system and more particularly to a charging system for quickly charging a battery.

BACKGROUND OF THE INVENTION

This invention relates to a charging system for batteries, and more particularly, a charging system for batteries used in power tools. Charging systems for rechargeable power tools generally charge until the battery is fully charged. Often, a user will operate a power tool powered by a lithium ion battery and the battery pack may run out of charge before the work is finished. When this happens, the user may not need a fully charged battery to complete the task, and may only need a battery with a fraction (such as A % of the full battery capacity) of the full capacity to finish the remaining work. For example, a user may require a charging mode for a charger able to charge the battery to 25% capacity within a very short time B, like 3 minutes. Currently, quick-charging chargers available in the market for lithium ion batteries have a very high design cost and have poor mode selectivity and cannot charge the battery to a certain amount to allow a user to finish a certain amount of work in a very short time.

SUMMARY OF THE INVENTION

The present application provides a charger with a selectable charging mode for safely charging a battery to a certain amount of capacity (energy) in a short time to allow a user to finish a certain amount of work.

The present application provides a charging system which may have a charger and a battery. The charging system may have a quick-charging mode and a normal-charging mode, where the quick-charging mode can charge the battery to a preset condition. The charging system may also have an indicating device to indicate that the battery has finished charging in quick-charging mode.

Preferably, the charging current of the quick-charging mode is higher than that of the normal-charging mode and the charging time of the quick-charging mode is less than that of the normal-charging mode. Switching from the quick-charging mode to the normal-charging mode may be implemented by a control circuit that contains a temperature-detecting circuit and a voltage-detecting circuit so that the mode may switch automatically depending on the current real-time temperature and voltage values. Switching from the quick-charging mode to the normal-charging mode may also be triggered by a control switch on an operation panel for manual selection by a user.

The benefit of the above disclosure is that the charger of the present application provides selective charging modes, wherein one of the modes comprises a quick-charging solution which detects and reacts to the temperature change and the voltage change. Because the charger is designed with the selectable quick-charging mode, when the battery is at low voltage and the battery's temperature change trend is suitable, the charger can increase the charging power so as to charge the battery within a short amount of time and until the battery is charged to A % of capacity which would be enough to finish a certain amount of urgent work.

BRIEF DESCRIPTION OF THE DRAWINGS

To understand the present application, it will now be described by way of example, with reference to the accompanying drawings in which.

DETAILED DESCRIPTION

Figure 1:
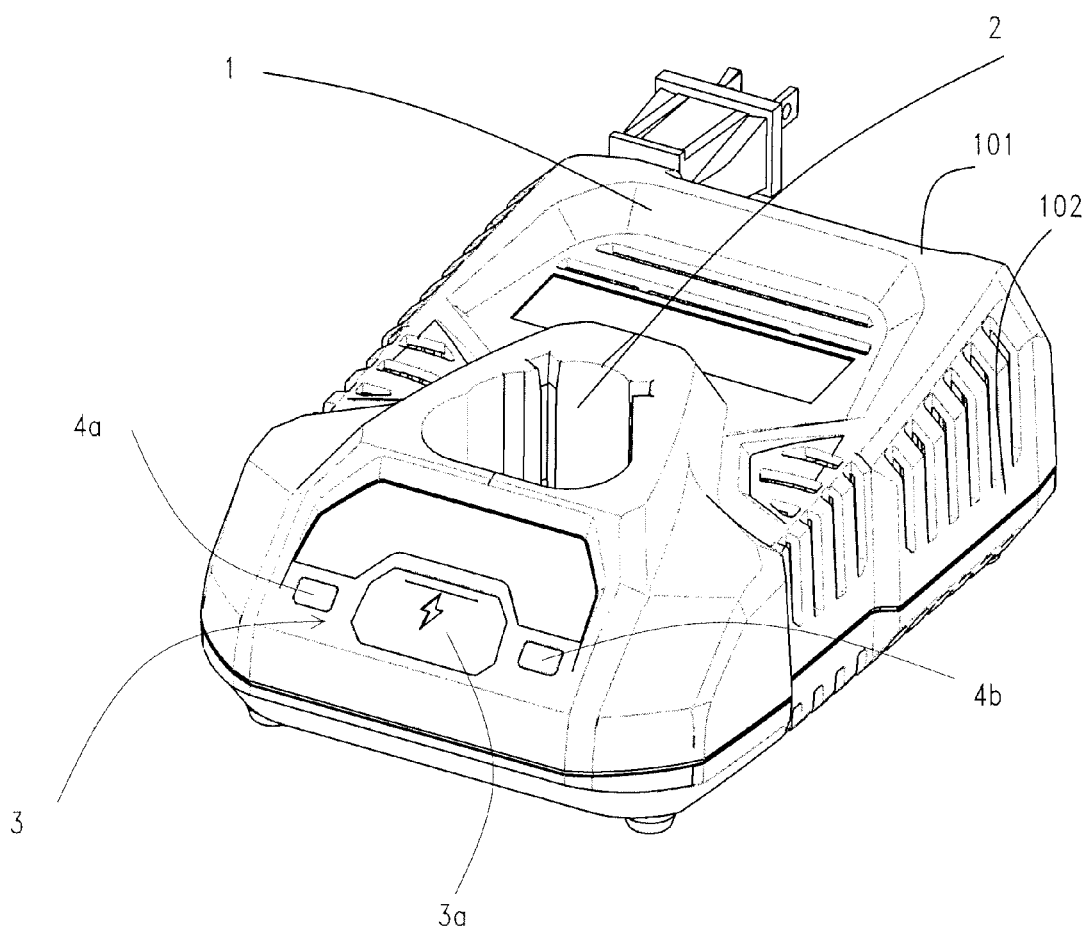
FIG. 1 is a schematic view of the charger according to the present application.

The present application is further described as below with reference to the accompanying drawings. The following embodiments are merely used to illustrate the technical solution of the present application more distinctly but not to limit the protection scope of the present application. In the drawings, the reference numbers respectively represent: a housing 1; an upper housing 101; a lower housing 102; a charging slot 2; an operational panel 3; a control switch 3a; a red LED 4a; a green LED 4b; a charging circuit 5; a control circuit 6; an indicating circuit 7; a temperature-detecting circuit 8; a voltage-detecting circuit 9; a mode selection circuit 10; a charging conversion circuit 11; an AC-DC input circuit 110; a DC-DC power supply circuit 111; a DC voltage output circuit 112; and an outer trigger signal 13.

As shown, FIG. 1 is a schematic view of a preferred embodiment of charger for a cordless power tool according to the present application. A housing 1 is formed by an upper housing 101 and a lower housing 102 locked together as a whole. In this embodiment, the housing 1 comprises a charging slot 2 for placing a rechargeable battery. An inner cavity formed by the housing 1 comprises a charging circuit. Additionally housing 1 is provided with an operation panel 3 which comprises a control switch 3a. The control switch 3a may preferably be a press-button having backlight. The housing 1 additionally comprises a display device, which may be embodied as illuminated LED, LCD display or other available types of display device, for indicating the charging states. In this embodiment, the display device is embodied to comprise a red LED 4a and a green LED 4b.

The charger has a quick-charging mode (also called a Peak mode or a peak value charging mode) and a normal-charging mode. In another embodiment, the operation panel and the charging mode also can be arranged on a lithium ion battery, where the lithium ion battery can be internally built in the power tool or detachably provided on the power tool. In an embodiment of the present application, the nominal voltage of the battery pack is 12V, and the battery cell is cylindrical with the configuration being 18 mm (diameter)×65 mm (length) and the capacity of the battery cell is close to 1200 mAh or 1500 mAh. In the quick-charging mode, the charger can charge the battery to a predetermined partially-charged state in a very short time. The charger can also charge the battery normally in a normal-charging mode. The backlight of the control switch 3a is used to indicate whether the battery is able to be charged in the quick-charging mode. When the backlight of the control switch 3a becomes illuminated, it indicates that the battery conditions are consistent with conditions necessary for selecting the quick-charging mode. After the backlight of the control switch 3a is lit, the user may press the control switch 3a to initiate the quick-charging mode. When the quick-charging course begins, the backlight of control switch 3a will begin flickering to indicate that the battery is being charged quickly. After the quick-charging course is completed, the backlight of the control switch 3a remains illuminated without flickering, in order to remind the user that the quick-charging course is over.

The red LED 4a and the green LED 4b of the display device are used for reporting error and indicating the normal-charging state, respectively. When the red LED becomes illuminated, it indicates that the battery is in an error state, which may occur when there is something wrong for battery charging in one of the quick-charging mode and the normal-charging mode. The green LED 4b is used to indicate a charging state of the battery in the normal-charging mode, that is, the green LED 4b flickers while the battery is being charged in the normal-charging mode and the green LED 4b will remain illuminated without flickering when the battery is fully charged.

Figure 2:
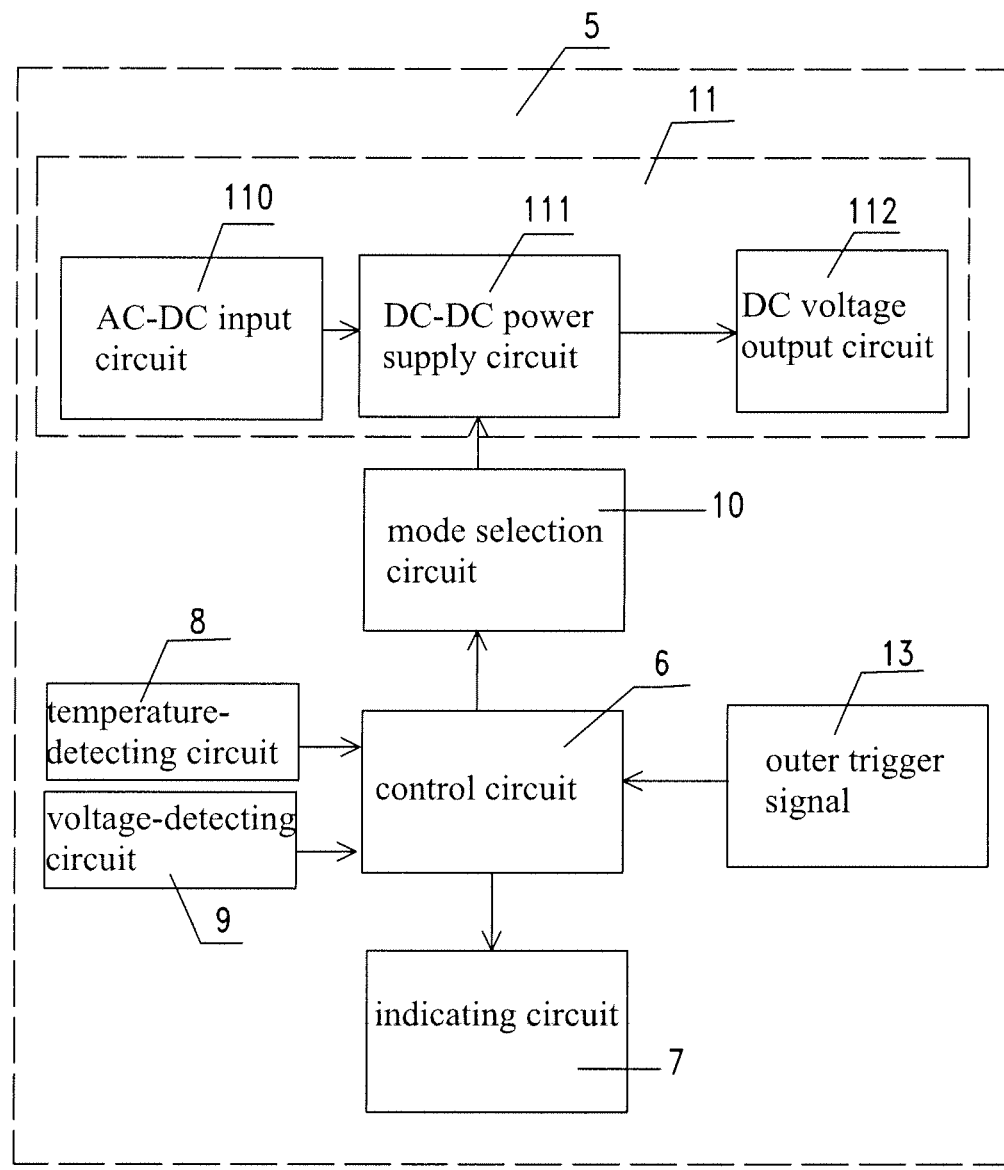
FIG. 2 is a module diagram of the charging circuit of the charger according to the present application.

As shown in FIG. 2, the charging circuit 5 of the charger according to the present application comprises a temperature-detecting circuit 8 and a voltage-detecting circuit 9 for detecting the current real-time temperature and voltage of the rechargeable battery being charged and transmits the detected value signals to a control circuit 6. The control circuit 6 receives and processes the value information from the temperature-detecting circuit 8 and the voltage-detecting circuit 9 and/or the input information from the outer operation panel 3 to control the charging mode of the charging circuit 5 and transmit the current status information to an indicating circuit 7 which may include a display device for indicating the charging state or other information to be displayed.

Depending on the control signals sent from the control circuit 6, a mode selection circuit 10 may choose to enter either the quick-charging mode or the normal-charging mode and can also switch between the two modes. A charging conversion circuit 11 is connected with the rechargeable battery and includes an AC-DC input circuit 110, a DC-DC power supply circuit 111 and a DC voltage output circuit 112 that are connected in turn, and can charge the rechargeable battery according to the charging mode selected by the mode selection circuit 10.

In an embodiment, the control circuit 6 determines and selects according to the current real-time temperature value, as detected by the temperature-detecting circuit 8, and the voltage value of the rechargeable battery as detected by the voltage-detecting circuit 9 so as to switch the charging mode automatically. When the temperature of the battery detected by the temperature-detecting circuit 8 matches up to the preset temperature range and the voltage of the battery detected by the voltage-detecting circuit 9 also matches up to the preset voltage range, then the control circuit 6 sends a control signal to the mode selection circuit 10 so as to switch the charging mode to the quick-charging mode.

In another embodiment, the control circuit 6 receives an outer trigger signal 13 to switch from one of the charging modes to the other one. The outer trigger signal 13 may be a signal generated by triggering a switch by a manual input, a light signal, an electronic signal, or a sound signal. In a preferred embodiment, the outer trigger signal 13 is an electric signal generated by the control switch 3a via manually pressing the control switch 3a on the operation panel 3.

The operation panel 3 may be in the form of push-button type, or touch type or a combination thereof. The partial or whole function of the indicating circuit 7 and the operation panel 3 can be integrated together. For example, both the charging time and the charging current can be set by operation panel 3.

Figure 3:
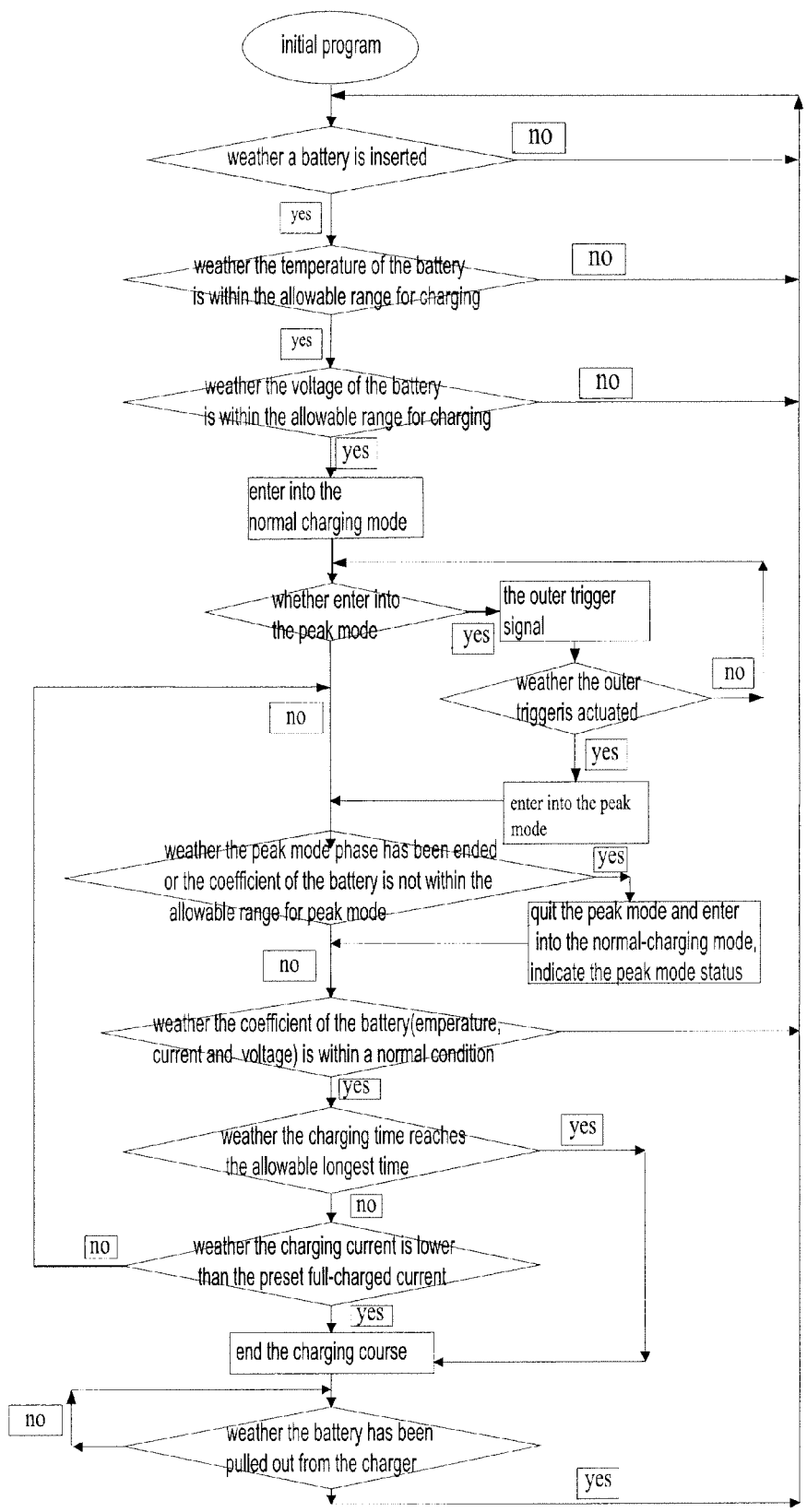
FIG. 3 is a workflow diagram of the charger according to the present application; and, FIG. 4 is a circuit diagram of the charging circuit shown in FIG. 2.

A work flow of the charger of the present embodiment according to the present application is shown in FIGS. 2 and 3. When the charger detects that a battery is inserted, the temperature-detecting circuit 8 and the voltage-detecting circuit 9 first determine whether the temperature and the voltage of the battery are within the allowable range for charging. If the battery needs to be charged, it can selectively enter into the quick-charging mode or the normal-charging mode via the mode selection circuit 10. In quick-charging mode the charging conversion circuit 11 can provide the rechargeable battery with a high charging current I1, for example, 6 A, so as to quickly charge the battery within a short time. In this embodiment, when the voltage of the battery reaches 12V, the charged voltage does not increase any more, and at the same time, the charging current output from the charging conversion circuit 11 decreases. The charger quits the quick-charging mode and is switched to the normal-charging mode when the charging current decreases to 3.3 A. There are two ways for the charger to selectively enter the quick-charging mode or the normal-charging mode, wherein one way is automatic switching, and the other way is non-automatic switching, i.e. trigger-control by the outer trigger signal 13. The trigger-control by the outer trigger signal 13 is introduced in this embodiment whereby the charger enters into the quick-charging mode when the control switch 3a is triggered.

In the quick-charging mode, the charging time and the charging current are preset, such that the preset charging current is I1, such as 6 A, which is greater than the charging current I2 (generally 3 A) in the normal-charging mode (I1>I2). The charging time period is preset as t1 such as 3 minutes. Since the battery is charged under such a high charging current, the energy of the battery can be charged to a predetermined partially charged level, such as 25%, within a very short preset time t1. This allows the user to accomplish a certain amount of work, and quickly satisfy a basic use demand for the user. Meanwhile, the allowable highest temperature of the battery during charging can be preset as T1, such as 40° C., and the highest voltage of the battery can be preset as V1 such as 12V. Once the charging time reaches the preset value T1, it quits the quick-charging mode. Or, when the detected temperature of the battery is greater than or equal to the present highest temperature T1 or the detected voltage of the battery is greater than or equal to the preset highest voltage V1, it quits the quick-charging mode automatically. Taking a 12V DC battery pack for a screwdriver being quickly charged within 3 minutes as an example, the practicable parameters obtained through experiments are listed in the following table, which can be specifically set according to different requirements, and all of which fall within the protection scope of the present application:

| Quick charging current (A) | Charging capacity (Wh) | Number of screws (number) |
| --- | --- | --- |
| 4.5 | 2.63 | 50 |
| 5.0 | 2.92 | 55 |
| 5.5 | 3.22 | 61 |
| 6.0 | 3.50 | 68 |

After quitting the quick-charging mode, if the battery has not been pulled out from the charger by the user, the charger switches to the normal-charging mode for charging and the green LED 4b flickers. The charging current I2 used in the normal-charging mode, such as 3 A, is lower than I1. In this mode, a series of charging parameters can be predetermined, for example, the allowable highest temperature during charging the battery can be preset as T2 such as 55° C. and the allowable highest voltage of the battery can be preset as V2, and the current of the battery can also be detected. If the detected temperature of the battery is greater than or equal to the preset highest temperature T2 or the detected voltage of the battery is greater than or equal to the preset highest voltage V2, it reports an error and returns back to the initial program and at the same time the red LED 4a becomes illuminated. If the detected current of the battery is abnormal, for example, close to zero, it may also report an error. If the detected voltage of the battery is also greater than or equal to the preset highest voltage V2, it reports an error and returns back to the initial program, and the red LED 4a becomes illuminated.

Because the battery is charged quickly with a high current in the quick-charging mode, it is possible to damage the battery or to cause a dangerous situation, and it therefore needs strict requirements for each measured coefficient of the battery in the quick-charging mode. Thus, the relationships among the charging coefficients of the battery in the above quick-charging mode and the normal mode are as below:

$$T1<T2; V1<V2;$$

If the temperature, the current and the voltage coefficients of the battery all meet the predetermined requirements in the normal charging mode, then the program continues to the next step to determine the charging time.

When the charging time reaches the maximum allowable time T2, such as 30 minutes, and the charging current is lower than the preset full-charged current I3, this indicates that the battery has been full charged. If the battery is fully charged, the charging course is ended and the green LED 4b remains illuminated, without flickering.

Figure 4:
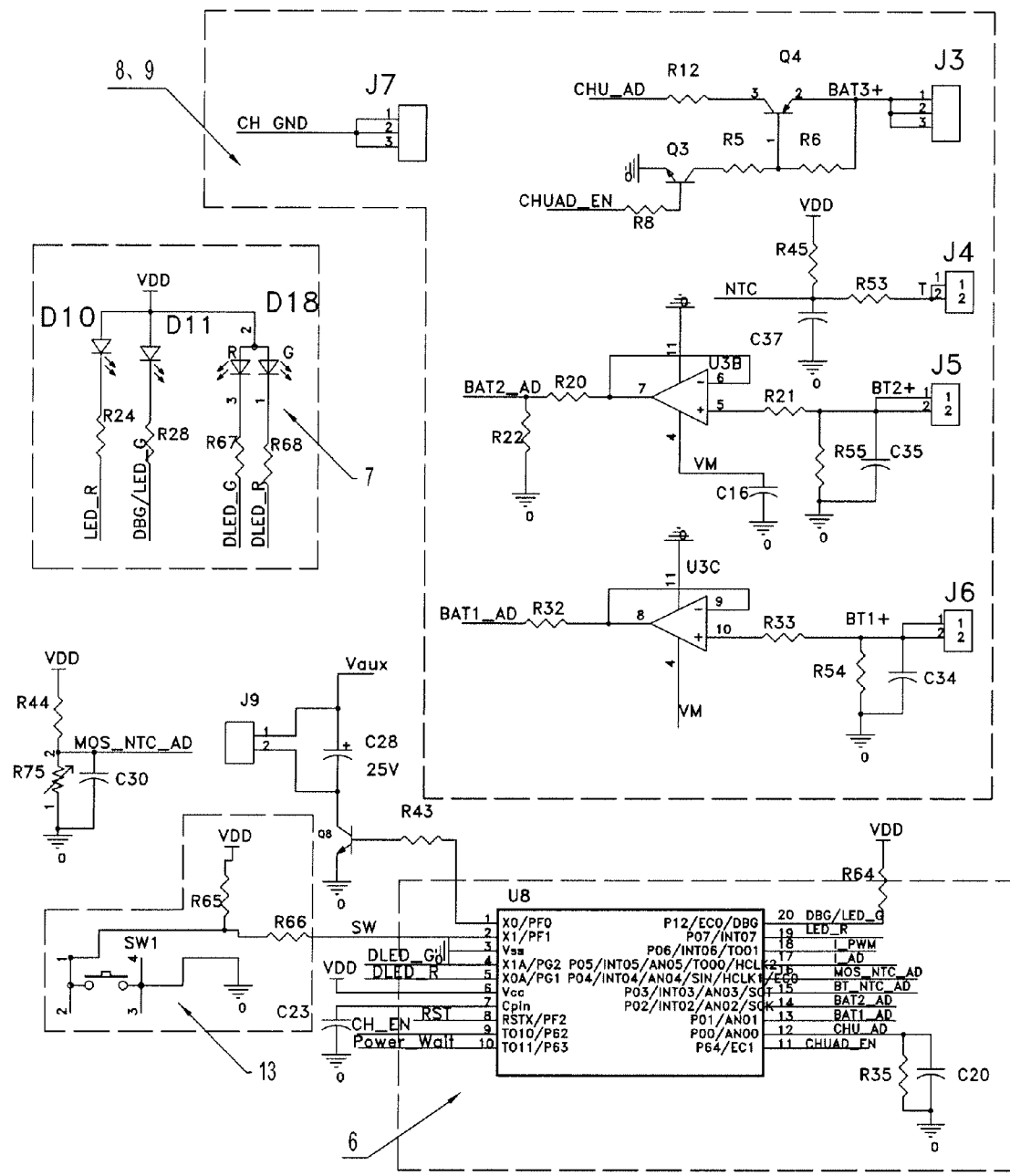

As shown in FIG. 4, port J3 is connected to the anode of the battery, port J7 is connected to the cathode of the battery, port J4 is connected to the port NTC of the battery, and ports J5 and J6 are connected to the ports of a single-cell battery. The chip of the MCU (Micro Control Unit) in the control circuit 6 is selected as U8. After the battery is inserted into the charger, the current temperature and the voltage of the battery can be determined by U8 via the detecting ports J4, J5, J6 and J7 of the temperature-detecting circuit 8 and the voltage-detecting circuit 9. Then, U8 decides whether it can enter into the quick-charging mode according to the information to ensure safe charging. When the set conditions for entering into the quick-charging mode are met, it can enter into the quick-charging mode automatically or be triggered by the outer trigger signal 13, wherein the outer trigger signal can be triggered by a micro switch SW1 as shown in FIG. 4 or the outer trigger signal can be triggered by input signals which rely on light, electricity, sound, etc. If entering into the quick-charging mode non-automatically, U8 can control to the charging in the normal-charging mode without triggering by the outer trigger signal 13.

In one embodiment, it is preferable to not enter into the quick-charging mode automatically. When the micro switch SW1, i.e., the control switch 3a on the operation panel 3 is triggered, U8 has detected the condition that it can enter into the quick-charging mode, and then the LED D18 of the indicating circuit 7 becomes illuminated to indicate that it can enter into the quick-charging mode, and at the same time the backlight of the control switch 3a becomes illuminated. Accordingly, the feedback circuit is controlled by U8 to charge the battery according to the set quick-charging current after the micro switch SW1 is pressed down. During charging, the LED D18 is flickering to indicate that it is in the process of quick-charging mode and at the same time the backlight of the control switch 3a is flickering. In this mode, the real-time voltage of J4, J5, J6 and J7 is detected by U8, and simultaneously it begins to measure the time, and the temperature of the charger per se is detected by U8 via R75 and it turns into the normal-charging mode automatically under the abnormal condition. When the quick-charging time reaches the preset charging time, the quick-charging course is finished. At the same time, the LED D18 remains illuminated, without flickering to indicate that the quick-charging phase has ended and the backlight of the control switch 3a remains illuminated, without flickering. At this time, the user can pull the battery out from the charger and use it for the desired task. When the quick-charging mode is stopped for any reason, like the temperature of the battery or the temperature of the charger, etc., the LED D18 goes out to indicate that the quick-charging mode is unavailable, and it then enters into the normal-charging mode automatically. At the same time, the LED D11 in the indicating circuit 7 is flickering so that the green LED 4b on the operation panel 3 is flickered, indicating that it is in the process of normal-charging mode. After the battery is full charged, the LED D11 and the green LED 4b in the indicating circuit 7 remains illuminated, without flickering, to indicate that the whole charging course has been finished.

When one battery pack finishes the quick-charging course, it may be replaced with the next battery pack and the next battery may be quick-charged. In this embodiment, the charger may consecutively complete up to five quick-charging courses. For three minutes immediately following five consecutive quick-charging courses, the charger may only proceed in normal charging. After the charger has completed 3 minutes of normal charging, the quick charging may proceed in quick-charging mode if the voltage and the temperature of the battery meet the conditions necessary for quick-charging.

In other embodiments, by detecting the current temperature and the voltage of the battery, the charger may enter into the quick-charging mode automatically to achieve quick-charging of the battery within a short time when the set conditions for entering into the quick-charging mode are met. Also, other trigger methods, other than the micro switch, can be used to input and select entrance into the quick-charging mode.

The embodiments described above are merely preferable embodiments of the present application. However, it should be noted that a person skilled in the art may adopt various improvements, and modifications may be made without departing from the technical principle of the present application and those improvements and modifications should be regarded to fall within the protection scope of the present application.

What is claimed is:

1. A charging system for a power tool, comprising:
   a lithium ion battery, wherein the lithium ion battery is provided with a lithium ion battery cell;
   a charger comprising a quick-charging mode for charging the lithium ion battery and a normal-charging mode for charging the lithium ion battery, wherein the lithium ion battery cell can be charged using one of the quick-charging mode with a charging current equal to or greater than 4.5 A and the normal-charging mode with a charging current less than that of the quick-charging mode; and,
   a control circuit to switch charging modes, in response to a trigger signal from a control switch, via a mode selection circuit that selectively enters into one of the quick-charging mode and the normal-charging mode in response to a control signal sent from the control circuit wherein in the quick-charging mode, the battery has a first allowable highest temperature, a first charging time and a first allowable highest voltage and in the normal-charging mode, the battery has a second allowable highest temperature, a second charging time and a second allowable highest voltage, and wherein the second allowable highest temperature is greater than the first allowable highest temperature, the second charging time is greater than the first charging time and the second allowable highest voltage is greater than the first allowable highest voltage; and,
   wherein the control circuit deactivates the quick-charging mode when one of the following conditions occur: (i) the battery temperature reaches the first allowable highest temperature; (ii) the battery charging time reaches the first charging time; or (iii) the battery voltage reaches the first allowable highest voltage.

2. The charging system according to claim 1, wherein the quick-charging current is at least 6 A.

3. The charging system according to claim 2, wherein the quick charging mode is preset with a first charging time of approximately 3 minutes within which the lithium ion battery can be charged to approximately 25% capacity.

4. The charging system according to claim 1, wherein a charging condition set by the quick-charging mode is that the first allowable highest temperature of the battery is 40° C. and the first highest voltage of the battery is 12V.

5. The charging system according to claim 1, wherein the charging system further comprises an indicating device for indicating whether the battery is in the quick-charging mode.

6. The charging system according to claim 5, wherein the indicating device is the control switch with backlight.

7. The charging system according to claim 1, wherein the charging modes can also be controlled to switch automatically by the charging system according to the temperature and voltage value detected by a temperature-detecting circuit and a voltage-detecting circuit.

8. The charging system according to claim 1, wherein the control switch is a key-press type.

9. The charging system according to claim 1, wherein the charging system further comprises a display device for displaying the state of the normal-charging mode.

10. The charging system according to claim 1, wherein the lithium ion battery has a nominal voltage of 12V and the single lithium ion battery cell has a nominal voltage of 4V.

11. The charging system according to claim 1, wherein the lithium ion battery is provided with one lithium ion battery cell.

12. The charging system according to claim 1, wherein the lithium ion battery is provided with a plurality of lithium ion battery cell.

13. A charging system for a power tool, comprising:
    a lithium ion battery;
    a charger comprising a charging circuit;
    the charging circuit having a quick-charging mode in which the battery is charged with a first current I1 and a normal-charging mode in which the battery is charged with a second current I2; and
    the charging circuit further comprising a control circuit to control the switching of the charging modes via a mode selection circuit that selectively enters into the quick-charging mode or the normal-charging mode according to a control signal sent from the control circuit, wherein the control circuit receives a trigger signal generated by a control switch on an operation panel, wherein in the quick-charging mode, the battery has a first allowable highest temperature, a first charging time t1 and a first allowable highest voltage and in the normal-charging mode, the battery has a second allowable highest temperature, a second charging time t2 and a second allowable highest voltage, and wherein the second allowable highest temperature is greater than the first allowable highest temperature, the second charging time t2 is greater than the first charging time t1 and the second allowable highest voltage is greater than the first allowable highest voltage; and,
    wherein the control circuit deactivates the quick-charging mode when either the battery temperature reaches the first allowable highest temperature or, the battery charging time reaches the first charging time t1, or the battery voltage reaches the first allowable highest voltage.

14. The charging system according to claim 13, wherein the first current I1 is greater than the second current I2.

15. The charging system according to claim 13, wherein the charging circuit further comprises an indicating circuit for indicating a charging state, a charging mode state, an abnormal state.

16. The charging system according to claim 13, wherein the charging circuit further comprises a temperature-detecting circuit and a voltage-detecting circuit for detecting a temperature and voltage of the battery and transmitting the detected values to the control circuit, the control circuit receives and processes information from the temperature-detecting circuit and the voltage-detecting circuit and other information received from the operation panel to control the charging mode of the charging circuit and transmit the current state information to the indicating circuit.

17. The charging system according to claim 13, wherein the charging circuit further comprises a charging conversion circuit connected to the battery for converting the AC electrical source to a DC electrical source according to the charging mode sent by the mode selection circuit to charge the battery.

18. The charging system according to claim 16, wherein the charging system detects the current temperature and voltage value of the battery via the temperature-detecting circuit and the voltage-detecting circuit to control an automatic switching charging mode.

19. The charging system according to claim 13, wherein the control switch is a key-press type.

20. The charging system according to claim 17, wherein the charging conversion circuit comprises an AC-DC input circuit, a DC-DC power supply circuit connected with the AC-DC input circuit, and a DC voltage output circuit connected with the DC-DC power supply circuit.

21. The charging system according to claim 13, wherein the first current I1 is at least 4.5 A.

22. The charging system according to claim 21, wherein the quick-charging mode is preset with a first charging time t1 close to 3 minutes within which the battery can be charged to approximately 25% capacity.

23. The charging system according to claim 13, wherein charging system further comprises an indicating device to indicate when the quick-charging mode is finished.

\* \* \* \* \*